(12) United States Patent
Fehrenkamp

(10) Patent No.: US 6,583,725 B2
(45) Date of Patent: Jun. 24, 2003

(54) MOTION SENSOR

(76) Inventor: William Fehrenkamp, P.O. Box 710255, Houston, TX (US) 77271

( * ) Notice: Subject to any disclaimer, the term of this patent is extended or adjusted under 35 U.S.C. 154(b) by 0 days.

(21) Appl. No.: 09/903,800

(22) Filed: Jul. 13, 2001

(65) Prior Publication Data

US 2003/0011480 A1 Jan. 16, 2003

(51) Int. Cl.[7] .............................................. G08B 21/00
(52) U.S. Cl. ....................................... 340/619; 340/689
(58) Field of Search ................................ 340/619, 669, 340/689, 690; 73/293

(56) References Cited

U.S. PATENT DOCUMENTS 3,999,178 A * 12/1976 Hamilton ................. 200/52 A
4,703,314 A * 10/1987 Spani ......................... 250/577
4,899,585 A * 2/1990 Kulha ......................... 340/619
5,743,135 A * 4/1998 Sayka et al. ................. 250/577
6,236,324 B1 * 5/2001 Nash .......................... 340/612
6,342,842 B2 * 1/2002 Chen ......................... 340/686.1

* cited by examiner

*Primary Examiner*—John Tweel
(74) *Attorney, Agent, or Firm*—Bill B. Berryhill

(57) ABSTRACT

A motion sensor having an outer tubular member closed at both ends thereof and an inner tubular member, concentrically disposed within the outer tubular member, forming therein an inner chamber and with the outer tubular member forming an outer chamber surrounding the inner chamber, the inner tubular member being provided with one or more apertures in walls thereof allowing fluid flow between the inner and outer chambers. A liquid at least partially fills the inner and outer chambers providing a liquid interface therein. Operatively connected to at least one of the tubular members are devices for determining the position of the liquid interface of the liquid.

14 Claims, 3 Drawing Sheets

A

B

C

D

E

F

G

H

I

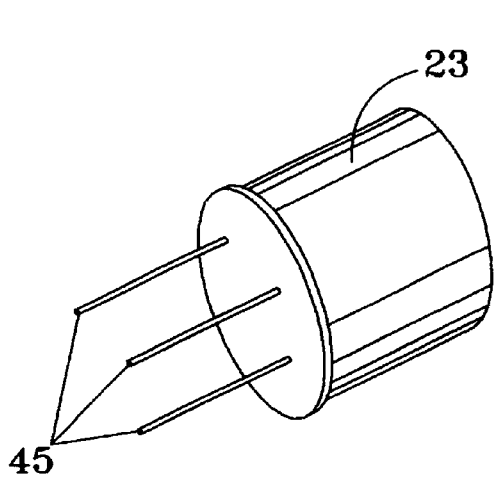
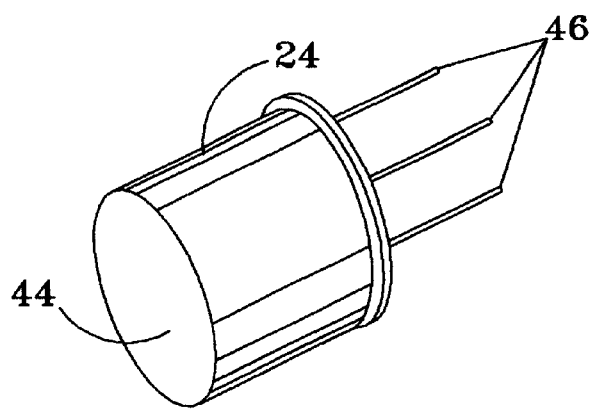
FIG.7A    FIG.7B
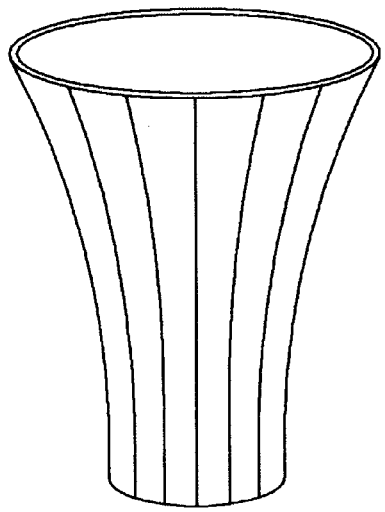
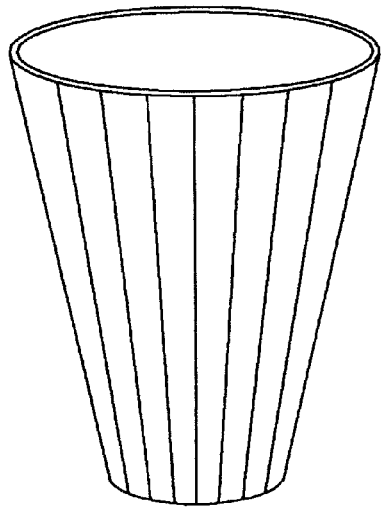
FIG.8    FIG.9

MOTION SENSOR

BACKGROUND OF THE INVENTION

1. Field of the Invention

The present invention relates generally to the field of motion sensors and, more particularly, to a new sensor having a combination of low frequency sensitivity and immunity to damage from mechanical shock and mechanical fatigue.

2. Description of the Prior Art

Motion sensors are used in a wide variety of applications and as a result many different types of motion sensors are available. They may be used to trigger the deployment of airbags in automobiles and to measure the vibration of machinery. In these examples the motion is of a relatively high amplitude and high frequency. The sensors available for such applications are rugged and nearly immune to failure from mechanical shock or mechanical fatigue. Motion sensors are also used in oil and gas exploration to measure the movement of the Earth itself. In this case the motion is of a much lower amplitude and lower frequency than in the previously mentioned examples. Such sensors have high rates of complete failure and degraded performance from mechanical shock and mechanical fatigue experienced in transportation and operation.

Almost all motion sensors use a spring and mass to detect motion. Under acceleration the spring will deflect and the mass will move in proportion to the frequency and amplitude of the acceleration. The movement of the mass is converted to an electrical signal that is representative of the frequency and amplitude of the acceleration. In the case of airbag sensors and machinery vibration sensors the spring is a mechanically sturdy device that is not easily subject to damage. However, the requirements imposed on motion sensors for use in oil and gas prospecting preclude the use of a sturdy spring. These motion sensors, commonly called geophones, have a pair of thin delicate easily damaged springs. This type of spring cannot be avoided if the geophone is to have the required low frequency response and sensitivity to low amplitude motion. Much effort has been expended in seeking alternatives to the conventional geophone but to date none of the results have met with significant acceptance by the industry.

SUMMARY OF THE INVENTION

The present invention substitutes liquid movement for the movement of a spring suspended mass. The present invention is a geophone with no moving parts except for a liquid or liquids. This geophone or motion sensor has significantly better resistance to damage from mechanical shock and mechanical fatigue.

The sensor of the present invention is dependent on the flow of liquids in three dimensions. In a preferred embodiment, it comprises two tubular members, one inside the other, forming inner and outer chambers. The larger is closed at the bottom and top. The smaller tubular member is positioned coaxially and coincidently with the larger tubular member. The smaller tubular member has openings in or near the top and bottom so that liquid may flow between the two chambers. The chambers are partially filled with a single liquid or completely filled with two immiscible liquids of different density. The diameters of the chambers are chosen so that the mass of the liquid subject to capillary rise in one chamber differs from the mass of the liquid subject to capillary rise in the other chamber. When the sensor is placed in a gravitation field, capillary rise will cause the level of the liquid in the chambers to differ. If the mass subject to capillary rise in the inner chamber is larger, then for water and other liquids where the capillary rise is positive, the liquid in the inner chamber will rise above the level of the liquid in the outer chamber. For mercury and other liquids where the capillary rise is negative, the liquid in the outer chamber will rise above the level of the liquid in the inner chamber.

In the absence of acceleration, the liquid interface in the smaller inner chamber will, as a first order approximation, be a circle. As a second order approximation it may be visualized as a round shallow dish. Under vertical acceleration the liquid interface will move up in one chamber and down in the other depending on the sign or direction of the acceleration. With lateral acceleration the liquid interface will form, as a first order approximation, an ellipse. The projection of the major axis of the ellipse on to a horizontal plane will form a vector in the direction of the lateral acceleration. The magnitude of the lateral acceleration is defined by the angle between the major axis of the ellipse and the horizontal plane. As a second order approximation it may be visualized as an oval shaped shallow dish. The position and shape of the liquid interface in the smaller chamber may be measured to determine the three axis acceleration present.

The outer chamber will have a liquid interface like that of the smaller inner chamber except that it will be interrupted in the center by the inner tubular member. It may be visualized as a shallow dish with a hole in the middle. As with the inner chamber the position and shape of the liquid interface in the outer chamber may be measured to determine the acceleration present.

There are many ways to measure liquid position and thus determine the amplitude and frequency of motion with the motion sensor of the present invention. In a preferred embodiment this is accomplished by a photoemitter and a photodetector disposed at opposite ends of the inner chamber.

BRIEF DESCRIPTION OF THE DRAWINGS

FIGS. 7A and 7B are pictorial representations of a photoemitter and photodetector utilized in a preferred embodiment of the invention; and FIGS. 8 and 9 are two alternative shapes which may be used as chambers for the motion sensor of the present invention.

DESCRIPTION OF A PREFERRED EMBODIMENT

Figure 1:
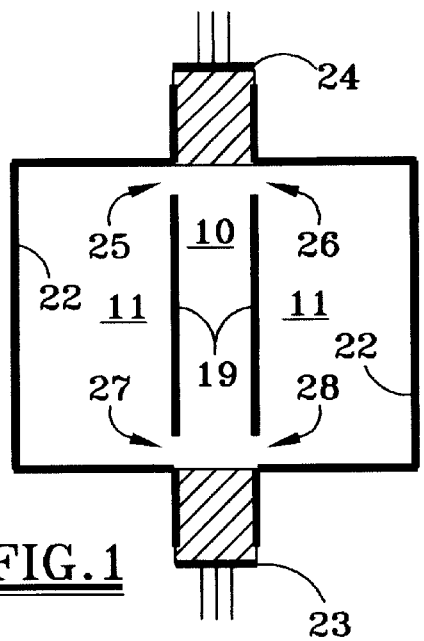
FIG. 1 is a cross section view of a three dimensional sensor, according to a preferred embodiment of the invention, with vertical axis measurement capability and without liquid present.
Figure 2:
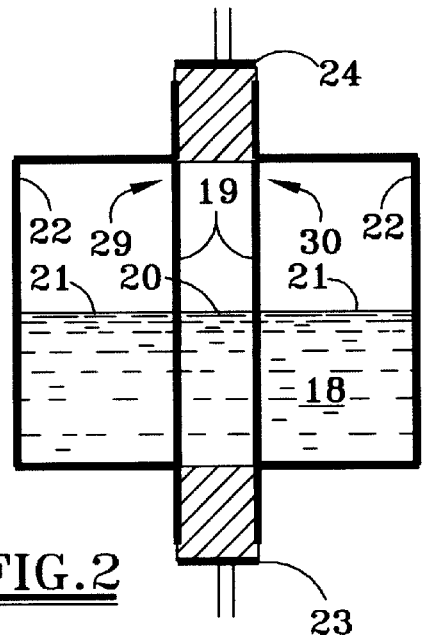
FIG. 2 is a cross section view of the sensor of FIG. 1 rotated ninety degrees from FIG. 1 and showing liquid present therein.

FIG. 1 and FIG. 2 depict a motion sensor with vertical axis measurement capability. FIG. 1 is a cross section view showing a tubular member 19 forming an inner chamber 10 and provided with openings, 25, 26, 27, and 28, which permit a liquid to flow to and from an outer annular chamber 11, the outer limit of which is defined by tubular member 22. A photoemitter 23 is disposed in one end of tubular member 19 to illuminate a photodetector 24, disposed in the opposite end of tubular member 19, with infrared radiation. FIG. 2 shows the same sensor in another cross section view rotated ninety degrees from the view of FIG. 1. In FIG. 2 a liquid 18 has been added. The supporting sections 29 and 30 for the inner tubular member 19 appear and the openings 25 and 26 disappear from view as a result of the rotation. The lower openings 27 and 28 also disappear from view as the sensor is rotated in cross section.

Figure 6:
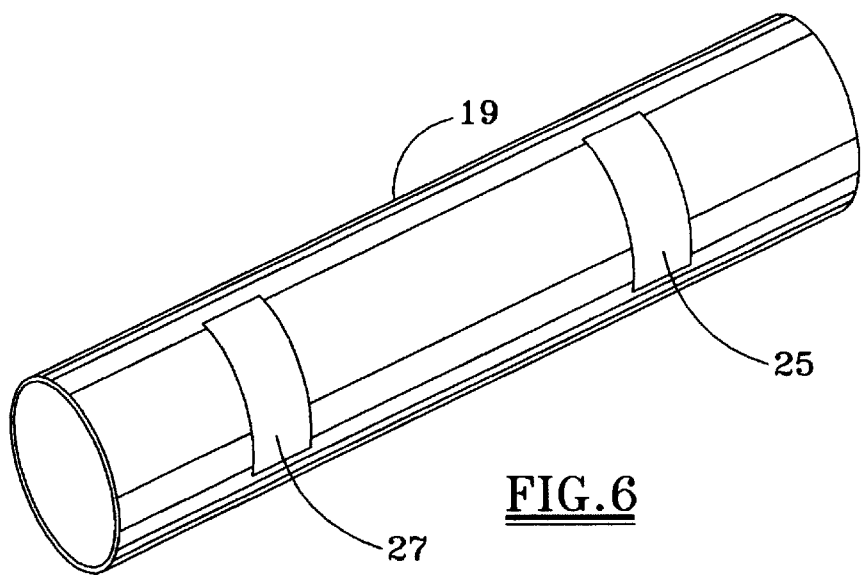
FIG. 6 is a pictorial representation of a tubular member used to form the inner chamber and to hold a photodetector and photoemitter of a motion sensor according to a preferred embodiment of the present invention.

In an exemplary embodiment, the inner tubular member 19 and mounting for the photoemitter 23 and the photodetector 24 are constructed from a thin wall metal tube with a nominal outside diameter of 0.217 inches and a nominal inside diameter of 0.185 inches as shown in FIG. 6. The overall length of the tube is nominally 1.1 inches. FIG. 6 shows two slots or apertures, 25 and 27, which have been cut in the tube. Two more slots or apertures have been cut on the reverse side of the tube at the same points along the length of the tube. These slots are represented by the openings 25, 26, 27, and 28 shown in FIG. 1. The slots are cut so that approximately ninety percent of the periphery of the tube 19 is removed by the cuts. The slots are cut at a nominal distance of 0.2 inch from the ends of the tube and extend a nominal distance of 0.07 inch along the length of the tube.

The photoemitter 23 and photodetector 24 are encased by the manufacturer in modified TO-18 hermetic packages as depicted in FIG. 7A and FIG. 7B. TO-18 is an industry standard designation for packaging semiconductor devices. The unmodified TO-18 package has a metal top. The modification is a lens in place of the metal top. This lens 44 is shown in FIG. 7B. The electrical connections on the bottom are shown at 45 in FIG. 7A and 46 in FIG. 7B. The cases have a nominal diameter of 0.185 inch and a nominal height of 0.20 inch. The TO-18 cases are inserted in opposite ends of the tube 19 up to but not past the point where they would cover the slots 25, 26, 27, 28. The outer tube 22 can be fabricated from ¾ inch copper water pipe and from end caps used with such pipe.

The photoemitter 23 can be a Texas Instruments Inc., type TIL31B and the photodetector 24 a Texas Instruments Inc. type TIL81. Electrical power to the photoemitter 23 can be provided as defined in the specifications of the manufacturer. The circuitry can consist of a current source or a resistor in series with a voltage source to provide the needed current drive. Raising or lowering the current will change the level of illumination and this in turn will raise or lower the electrical signal from the photodetector for a constant acceleration. The circuitry for the photodetector 24 can be as shown in the test circuits included with the specifications of the manufacturer. The manufacturer of the photodetector 24 specifies it for operation as either a phototransistor or a photodiode. Circuitry for improved performance is well known. One example is a Nov. 7, 1991 article in EDN magazine by Jim Williams. It includes a circuit that functions over five decades of light intensity. It should be noted that the cases are in electrical contact with the metal inner tube 19. This may require the use of separate power supplies. Insulating sleeves over the cases may be used as an alternative.

The liquid 18 may be a light petroleum distillate with a viscosity comparable to water. Such a product is sold under the brand name Old English® Furniture Polish.

Although the photoemitter 23 and photodetector 24 are shown mounted in the case of the sensor this is not a requirement. Fiber optic cables may be used to remotely locate either the photoemitter 23, the photodetector 24, or both. Generally, the diameter of such fiber optic cables would be smaller than that of the TO-18 packages of the photoemitter 23 and photodetector 24. When the diameter of the fiber optic cables is smaller than the diameter of the inner chamber 10, the fiber optic cables must be carefully mounted along the central axis of symmetry of the inner chamber 10. This positioning, as a first order approximation, will cancel the effect of a tilt in the liquid interface. The effect of this tilt must be cancelled if the sensor is to be responsive only to the vertical acceleration and not the lateral acceleration. If the liquid interface is tilted then one side of the chamber will pass slightly more illumination and the other side will pass slightly less. If the photoemitter and photodetector are centered then the changes in illumination on each side will be approximately equal but opposite in direction and so will cancel.

The diameter of the TO-18 packages of the photoemitter 23 and photodetector 24 is approximately equal to the inner diameter of the metal tube 19 that forms the smaller or inner chamber 10. In this instance they are inherently centered in the chamber 10. However if photodetectors or photoemitters with smaller diameter cases are chosen then the same centering requirements as with fiber optic cables must be observed. An example of a photoemitter with a smaller diameter case is the Texas Instruments Inc. type TIL24. The Texas Instruments Inc. type TIL604 is an example of a photodetector with a smaller diameter case. Both have a nominal diameter of 0.060 inch.

Figure 3:
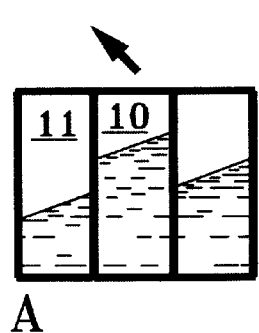
FIGS. 3(A–I) are representations of the sensor of FIGS. 1 and 2, illustrating various combinations of vertical and horizontal acceleration thereof.
Figure 3:
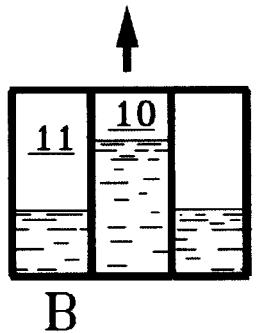
Figure 3:
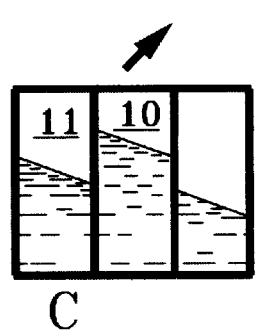
Figure 3:
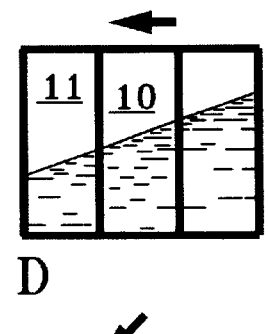
Figure 3:
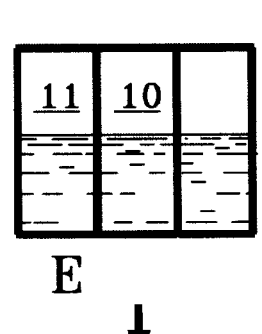
Figure 3:
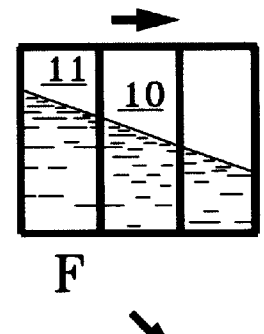
Figure 3:
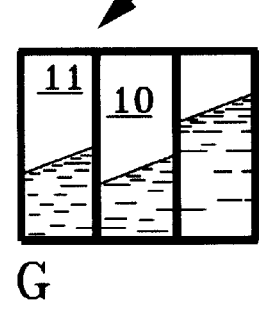
Figure 3:
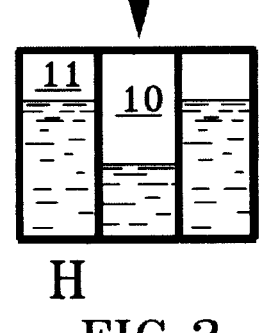
Figure 3:
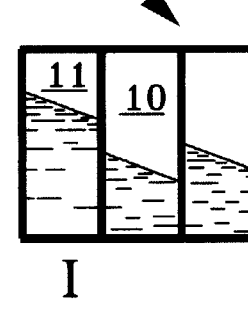

As so far described, the sensor provides only for measurement of the vertical component of acceleration. FIG. 3 shows nine representations, A through I, of the sensor of FIGS. 1 and 2 under various conditions of vertical and lateral acceleration. E represents no vertical or lateral acceleration. B represents upward vertical acceleration only. H represents downward acceleration only. D represents horizontal acceleration only to the left. F represents horizontal acceleration only to the right. The others, A, C, G and I, represent acceleration, with both vertical and horizontal components, in the direction indicated by the arrows above each.

Figures 4, 5:
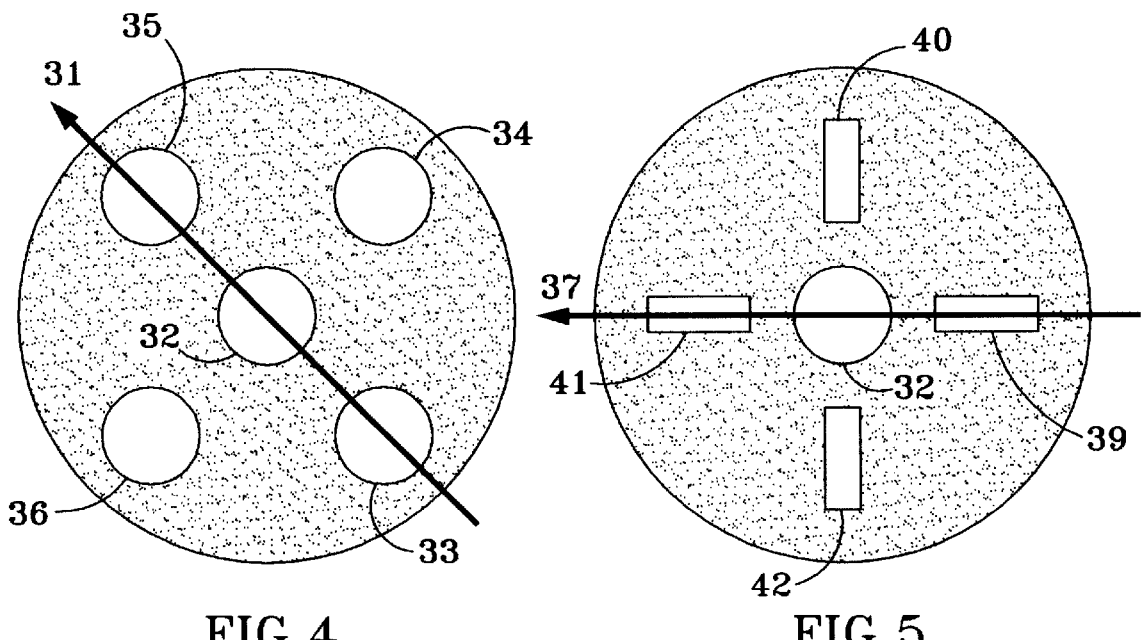
FIG. 4 is a plan view array of photodetectors showing five regions, all with two dimensional symmetry, used to develop three electrical signals that represent three axis acceleration in another embodiment of the invention.
FIG. 5 is a plan view array of photodetectors showing five regions, only one with two dimensional symmetry, used to develop three electrical signals that represent three axis acceleration in still another embodiment of the invention.

The lateral components of acceleration may be measured by adding two or more photoemitter and photodetector sets to determine the tilt of the liquid interface. FIG. 4 depicts a horizontal cross section view of four photoemitter and photodetector sets that have been added to the previously described set that was used to measure vertical acceleration. The original set 23, 24, represented at 32, is shown with the four added sets 33, 34, 35, and 36, positioned at ninety degree angles around the original set 32. Size constraints will require that the four added sets be located in the outer chamber 11. The difference between the electrical signal from set 33 and the electrical signal from set 35 is an electrical signal that is determined by the acceleration along the lateral vector 31. An orthogonal lateral vector is determined by the difference between set 34 and set 36.

It is possible to determine the position of the liquid interface with as few as three photodetectors provided they do not lie in a straight line. The reduction in the number of photodetectors is accompanied by an increase in the complexity of the associated electronics. While the dimensions given for the sensor are exact, these dimensions are not a requirement. Broad variations are possible and desirable to alter the performance specifications of the sensor. Although the exact type numbers of the manufacturer have been specified for the photodetector and photoemitter these type numbers are not required. Radio Shack, a division of Tandy Corporation, sells an infrared emitter and detector pair under the part number 276-142 that has been successfully used. The type numbers provided in this package vary considerably from lot to lot and industry experience would suggest that the plastic package versions may not have the long term reliability of the hermetic metal case versions.

Individual discrete photodetectors and photoemitters are not required for measuring the liquid interface position. A common consumer product, the camcorder, has an array of photodetectors used as the image sensor. An array of this type can be used with a single photoemitter. Because of size constraints of the individual photodetectors, four of the five of FIG. 4 had to be placed in the outer chamber. Only the vertical component photodetector was placed in the inner chamber. With the use of an array it is possible to place all the photodetectors in the inner chamber. The photodetector array as used in the camcorder has many thousands of photodetectors. Assume now that FIG. 4 represents such an array. If the electrical signals from all the photodetectors within the circle 32 are added the resulting electrical signal will represent the vertical component of the acceleration. The sum of all the electrical signals forms the equivalent of a single photodetector of the size and shape of the set circle 32. Note that once again the equivalent photodetector for the vertical component has been centered so that, as a first order approximation, the tilt of the liquid interface with lateral acceleration is cancelled. Consider now the set circles 33, 34, 35, and 36, and the photodetectors defined by each. If the electrical signals from the photodetectors within a given circle are added they form the equivalent of an electrical signal from a discrete photodetector represented by the circle. This configuration then differs from the previous configuration only in that the photodetectors have been moved from the outer chamber 11 to the inner chamber 10. The difference between circle 33 and circle 35 represents one lateral axis and the difference between circle 34 and circle 36 the other lateral axis.

The arrangement of the photodetectors and photoemitters may be reversed. That is, an array of photoemitters may be used with a single photodetector. Computers, calculators and similar electronic devices commonly use an array of photoemitters for a display. The array of photoemitters is electrically scanned in a time sequence and the electrical signal from the photodetector at the instant in time that a photoemitter is illuminated will be the equivalent of a single photodetector electrical signal for the original array using photodetectors. Mechanical scanning may be used as an alternative to the array. However, unless such mechanical scanning apparatus is very resistant to mechanical shock and mechanical fatigue it may defeat one of the principal advantages of the sensor. An example of the mechanical scanning process is the equipment used in retail establishments to read the bar coded product identification.

The locations of the photoemitters 23 and photodetectors 24 in FIG. 1 and FIG. 2 show the use of the change in optical transmission characteristic to measure the position of the liquid interface. Where scanning techniques are used to determine the position of the liquid interface the reflection characteristic is a clear alternative to the transmission characteristic. Where high resolution output is required optical interferometry may be used to measure the position of the liquid interface. U.S. Pat. No. 4,500,979 is an example of the use of optical interferometry to measure position. U.S. Pat. No. 5,109,362 is an example that combines laser interferometry with the scanning technique. When high resolution is required it may be beneficial to coat the surfaces of the chambers with an anti-reflective coating.

In FIG. 4 the photodetectors of each set are all shown with a circular shape. This is required for the central photodetector of set 32 to cancel the effect of tilt. However it is not required for photodetectors of sets 33, 34, 35 and 36 that measure the tilt. One alternative arrangement is depicted in FIG. 5 where circular sets 33–36 are replaced with rectangular sets 39, 40, 41 and 42. Although other considerations may dominate, this arrangement can offer improvement in performance especially when an array is used to create equivalent photodetectors by adding the electrical signals from the photodetectors within the defined shapes. This is equally true when scanned photoemitters are employed.

Optical techniques, both visible and infrared, have inherent nonlinearities involved in the determination of the position of the liquid interface. While corrections for nonlinearity may be included in the computer equipment that records the data, it is also possible to make corrections in the sensor itself. The present invention has been depicted as having two chambers with a cylindrical shape. However, only the radial symmetry at each point along the central axis of the chambers is required. FIG. 8 and FIG. 9 present two alternatives. FIG. 8 is a section of a one-sheet hyperboloid of rotation. FIG. 9 is a section of a cone. The mass of the liquid in such a chamber will not be in linear proportion to the acceleration. The nonlinearity can be used to correct for other nonlinearities.

Many different techniques are known for the measurement of liquid position. Some of these same techniques may be employed to measure the position of the liquid interface. If the electrical conductivity changes at the liquid interface, then passing a current through the liquid will yield a voltage that determines the liquid position. A high conductivity liquid such as mercury can be used with resistance elements positioned in or about the interface. Or a liquid of moderate conductivity may be employed with electrical contacts positioned in or about the interface. If the dielectric constant changes at the liquid interface, then capacitor plates may be positioned in or about the liquid interface, and the position of the liquid may be determined by the change in the capacitance values. Likewise, if the permittivity constant changes at the liquid interface, then inductance elements may be positioned in or about the liquid interface, and the position of the liquid may be determined by the change in the inductance values. Many techniques are available to convert a change in conductivity, capacitance or inductance to an electrical signal.

Acoustic or ultrasonic techniques have long been used to measure liquid position. The marine depth finder is one example. In this device an ultrasonic transducer is used to send pulses from the top of the water to the bottom of the water where they are reflected and return to the surface. The same transducer that sent the pulse is also used to receive the pulse. The time from the sending of the pulse to the return of the pulse is measured to determine the depth of the water. With appropriate scaling of the pulse repetition frequency this technique may be used to measure the position of the liquid interface in the sensor. Because of the much smaller distances involved, other acoustic or ultrasonic techniques may be used. If a continuous sinusoidal signal is sent from one ultrasonic transducer and received by another transducer then the phase difference between the transmitted and received frequencies may be used to determine the position of the liquid interface.

The selection of a liquid for the sensor must take into account a broad range of requirements. The light hydrocarbon, Old English® Furniture Polish, has been chosen primarily for availability. It is adequate for low amplitude and low frequency applications of the sensor at room temperature. However, it is subject to foaming at high frequencies and amplitudes. In addition, the performance characteristics of the sensor will vary with temperature due to a change in viscosity of the liquid. The motor oils used in automobiles have ingredients that reduce the foaming and the change in viscosity with temperature. These types of ingredients will improve the performance of the sensor regardless of the method used to measure the liquid interface position. Where the liquid position is measured by optical transmission, either visible or infrared, the inclusion of a dye in the liquid can be used to modify the optical transmission characteristic of the liquid. In general, the method of determining liquid position must be considered in selecting a liquid. As examples, this would include dielectric constant if the capacitance variation is to measure liquid interface position and the permittivity constant if inductance variation is to be used.

Two liquids rather than one may be used to create a liquid interface. The liquids must be immiscible and any bubble of air or gas above the top liquid must be eliminated. If a bubble remains, the heights of the liquids in the two chambers may change causing the sensor parameters to change. This change can occur in normal transportation when the sensor is tilted from vertical.

To this point it has been assumed that the tilt in the liquid interface was only the result of lateral acceleration. It was also assumed that the sensor was positioned precisely vertical on the surface of the Earth. In practice, these two assumptions are only approximately correct. Under field conditions the sensors will, in most cases, be positioned only approximately vertical. As a result there will be a small static tilt in the liquid interface position with no acceleration present. This static tilt will cause a constant error term in the measured acceleration. However, because it is constant, it may be removed from the final result, if the value can be determined. In most situations the use of the sensor is preceded or followed by a period when no significant acceleration is present. If the constant error term is recorded under these conditions it may later be mathematically removed from the final result. The constant error term is closely approximated by the output of the sensor with no appreciable acceleration present. The ordinary spring and mass geophone has an error term present when it is deployed with a slight tilt. However, with the conventional spring and mass geophone there is no practical way to determine that the geophone is tilted. It has no electrical signal output to indicate a tilt is present. With the present improved sensor or geophone the error is easily measured, the amount of tilt recorded, and the tilt error mathematically removed from the recorded data.

All of the previous explanations have assumed that the sensor will be positioned vertically, or nearly vertically, on the surface of the Earth. More generally, it is assumed that the central axis of the sensor is parallel, or nearly parallel, to a gravitational field. Two changes will remove these restrictions. If the sensor is placed in the field of a permanent magnet or in the field of a electromagnet and if the liquid or liquids used in the sensor are magnetic liquids then the sensor will operate without the stated restrictions.

Magnetic liquids have been referred to as "magnetic fluids". An example is an advertisement in the March 1981 issue of Audio magazine on page 50. Here the liquid is used to provide cooling for a loudspeaker. U.S. Pat. No. 4,618, 949 uses the term "ferrofluid" and the term "magnetic fluid" in referring to the liquid. A significantly improved magnetic liquid is described in the Apr. 24, 1995 edition of Electronic Engineering Times on page 41. In this article the term magnetic liquid is used but the terms magnetic fluid and mesoscopic liquid are also used. All refer to a liquid that is attracted to a magnetic field just as solid magnetic materials are attracted to a magnetic field.

The principles, preferred embodiment and modes of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention. Accordingly, it is intended that the scope of the invention be limited only by the claims which follow.

What is claimed is:

1. A motion sensor comprising:
   a first outer tubular member closed at both ends thereof;
   a second inner tubular member, concentrically disposed within said first tubular member, forming therein an inner chamber and with said first tubular member forming an outer chamber surrounding said inner chamber, said second tubular member being provided with one or more apertures in walls thereof allowing fluid flow between said inner and outer chambers;
   a liquid at least partially filling said inner and outer chambers and providing a liquid interface therein; and
   means operatively connected to at least one of said first and second tubular members for continuously or time sequentially determining the position of said liquid interface of said liquid.

2. The motion sensor of claim 1 in which said second tubular member is provided with one or more apertures in or near each end thereof to allow fluid flow between said inner and outer chambers and opposite ends thereof.

3. The motion sensor of claim 1 including a second liquid, said first and second liquids completely filling said first and second chambers and being immiscible with each other.

4. The motion sensor of claim 1 in which said means for determining the position of said liquid interface comprises means for measuring light transmitted through said liquid.

5. The motion sensor of claim 1 in which said means for determining the position of said liquid interface comprises means for measuring light reflected from said liquid.

6. The motion sensor of claim 4 in which said means for determining the position of said liquid interface comprises a photoemitter for emitting light through one end of said inner chamber and a photodetector for measuring the amount of light transmitted through said liquid to the opposite end of said inner chamber.

7. The motion sensor of claim 6 in which said photoemitter and said photodetector are mounted at opposite ends of said inner chamber.

8. The motion sensor of claim 6 in which at least one of said photoemitter and said photodetector is remotely operatively connected to a respective end of said inner chamber through fiber optic cable.

9. The motion sensor of claim 7 including two or more additional sets of photoemitters and photodetectors, each of said sets comprising a photoemitter at one end of said outer chamber and a corresponding photodetector at the opposite end of said outer chamber.

10. The motion sensor of claim 9 in which there are four of said additional sets of photoemitters and photodetectors, each of said additional sets being radially positioned at ninety degree intervals around said inner chamber set.

11. The motion sensor of claim 4 in which said means for determining the position of said liquid interface comprises a photoemitter for emitting light through one end of said inner chamber and an array of multiple photodetectors for measuring the amount of light transmitted through said liquid to the opposite end of said inner chamber.

12. The motion sensor of claim 4 in which said means for determining the position of said liquid interface comprises an array of multiple photoemitters for emitting light through one end of said inner chamber and a photodetector for measuring the amount of light transmitted through said liquid to the opposite end of said inner chamber.

13. The motion sensor of claim 1 in which said means for continuously or time sequentially determining the position of said liquid interface comprises an electrical circuit providing an electrical signal indicative of said liquid interface position.

14. The motion sensor of claim 13 in which said electrical circuit is provided with means for mathematically cancelling the effect of any static tilt of said tubular members relative to the gravitational field in which said sensor is employed.

* * * * *